(12) United States Patent
Jiang et al.

(10) Patent No.: US 11,150,327 B1
(45) Date of Patent: Oct. 19, 2021

(54) SYSTEM AND METHOD FOR SYNTHETIC APERTURE RADAR TARGET RECOGNITION USING MULTI-LAYER, RECURRENT SPIKING NEUROMORPHIC NETWORKS

(71) Applicants: Qin Jiang, Oak Park, CA (US); Youngkwan Cho, Los Angeles, CA (US); Nigel D. Stepp, Santa Monica, CA (US); Steven W. Skorheim, Los Angeles, CA (US); Vincent De Sapio, Westlake Village, CA (US); Jose Cruz-Albrecht, Oak Park, CA (US); Praveen K. Pilly, Tarzana, CA (US)

(72) Inventors: Qin Jiang, Oak Park, CA (US); Youngkwan Cho, Los Angeles, CA (US); Nigel D. Stepp, Santa Monica, CA (US); Steven W. Skorheim, Los Angeles, CA (US); Vincent De Sapio, Westlake Village, CA (US); Jose Cruz-Albrecht, Oak Park, CA (US); Praveen K. Pilly, Tarzana, CA (US)

(73) Assignee: HRL Laboratories, LLC, Malibu, CA (US)

( * ) Notice: Subject to any disclaimer, the term of this patent is extended or adjusted under 35 U.S.C. 154(b) by 472 days.

(21) Appl. No.: 16/044,179

(22) Filed: Jul. 24, 2018

Related U.S. Application Data

(60) Provisional application No. 62/617,035, filed on Jan. 12, 2018.

(51) Int. Cl.
*G01S 7/41* (2006.01)
*G06K 9/62* (2006.01)
(Continued)

(52) U.S. Cl.
CPC ............ *G01S 7/417* (2013.01); *G01S 13/904* (2019.05); *G06K 9/6268* (2013.01); *G06N 3/049* (2013.01)

(58) Field of Classification Search
CPC .......... G06N 3/049; G06N 3/084; G06N 3/08; G06K 9/00711; G06K 9/4628;
(Continued)

(56) References Cited

U.S. PATENT DOCUMENTS

| 7,245,250 B1 * | 7/2007 | Kalayeh .............. G01S 13/9017 342/25 R |
| 2009/0182697 A1 * | 7/2009 | Massaquoi ............... G06N 3/04 706/44 |

(Continued)

FOREIGN PATENT DOCUMENTS

WO   WO-2019074532 A1 *   4/2019   ........... G06N 3/0481

OTHER PUBLICATIONS

A. Basu et al., "Low-Power, Adaptive Neuromorphic Systems: Recent Progress and Future Directions," in IEEE Journal on Emerging and Selected Topics in Circuits and Systems, vol. 8, No. 1, pp. 6-27, Mar. 2018, doi: 10.1109/JETCAS.2018.2816339. (Year: 2018).*

*Primary Examiner* — Vladimir Magloire
*Assistant Examiner* — Alexander L. Syrkin
(74) *Attorney, Agent, or Firm* — Lewis Roca Rothgerber Christie, LLP

(57) ABSTRACT

A system configured to identify a target in a synthetic aperture radar signal includes: a feature extractor configured to extract a plurality of features from the synthetic aperture radar signal; an input spiking neural network configured to encode the features as a first plurality of spiking signals; a multi-layer recurrent neural network configured to compute a second plurality of spiking signals based on the first plurality of spiking signals; a readout neural layer config-
(Continued)

ured to compute a signal identifier based on the second plurality of spiking signals; and an output configured to output the signal identifier, the signal identifier identifying the target.

21 Claims, 11 Drawing Sheets

(51) Int. Cl.
*G06N 3/04* (2006.01)
*G01S 13/90* (2006.01)

(58) Field of Classification Search
CPC ... G06K 9/6268; A61B 5/04012; G01S 7/417; G01S 13/904
USPC .......................................................... 342/90
See application file for complete search history.

(56) References Cited

U.S. PATENT DOCUMENTS

| | | | |
|---|---|---|---|
| 2009/0278732 A1* | 11/2009 | Antonik | G01S 7/288 342/25 B |
| 2010/0052977 A1* | 3/2010 | Sathyendra | G01S 7/411 342/25 F |
| 2010/0109938 A1* | 5/2010 | Oswald | G01S 13/522 342/90 |
| 2016/0019458 A1* | 1/2016 | Kaufhold | G01S 13/90 342/25 F |
| 2017/0236051 A1* | 8/2017 | van der Made | G06N 3/088 706/27 |
| 2018/0053090 A1* | 2/2018 | Voelker | G06N 3/08 |
| 2018/0189645 A1* | 7/2018 | Chen | G06N 3/0635 |
| 2019/0370653 A1* | 12/2019 | Chakrabartty | G06N 3/08 |

* cited by examiner

SYSTEM AND METHOD FOR SYNTHETIC APERTURE RADAR TARGET RECOGNITION USING MULTI-LAYER, RECURRENT SPIKING NEUROMORPHIC NETWORKS

CROSS-REFERENCE TO RELATED APPLICATION(S)

This application claims the benefit of U.S. Provisional Patent Application No. 62/617,035, filed in the United States Patent and Trademark Office on Jan. 12, 2018, the entire disclosure of which is incorporated by reference herein. This application is also related to U.S. patent application Ser. No. 15/784,841, filed in the United States Patent and Trademark Office on Oct. 16, 2017, the entire disclosure of which is incorporated by reference herein.

BACKGROUND

Synthetic aperture radar (SAR) is widely used for target imaging and target recognition utilizing radio frequency (RF) electromagnetic waves. In SAR systems, electromagnetic waves are emitted toward a target and the reflected waves are collected by a radar antenna. Because SAR data is able to provide reflected RF signals from a target at a high resolution, the two-dimensional (2D) and/or three-dimensional (3D) shape of the target can be computed from the raw SAR data.

Generally, existing techniques use the raw SAR data called phase history data to form target images, such as bitmaps, and the target images are used for target recognition, such as by displaying the target images on a screen for viewing by a human operator. Forming target images from raw SAR data is a computationally intensive computing process, which requires significant computing power, which may make real-time target recognition difficult in many applications, especially where there are constraints on the size, weight, and power (SWAP) of the hardware.

A spiking neuromorphic network is inspired by the human brain in that it process signals in the spiking domain, where all of the signals are represented by spiking sequences. On average, spiking neuromorphic networks consume very little energy because energy is only consumed when there is a spike and because, most of the time, there is no spike.

SUMMARY

Aspects of embodiments of the present invention relate to a system and method for recognizing and classifying targets in raw SAR data utilizing recurrent, multi-layer spiking neuromorphic networks.

According to one embodiment of the present invention, a method for identifying a target in a synthetic aperture radar signal includes: extracting, by a feature extractor, a plurality of features from the synthetic aperture radar signal; encoding, by an input spiking neural network, the features as a first plurality of spiking signals; supplying the spiking signals to a multi-layer recurrent neural network to compute a second plurality of spiking signals; computing, by a readout neural layer, a signal identifier based on the second plurality of spiking signals; and outputting the signal identifier from the readout neural layer, the signal identifier identifying the target.

The plurality of features may include an amplitude of the synthetic aperture radar signal.

The plurality of features may include a phase of the synthetic aperture radar signal.

The readout neural layer may include a linear classifier.

The input spiking neural network, the multi-layer recurrent neural network, and the readout neural layer may be implemented by a neuromorphic chip.

The method may further include computing average spiking rates from the second plurality of spiking signals, wherein the signal identifier may be computed based on the average spiking rates.

The multi-layer recurrent neural network may include: a first excitatory neuron layer configured to receive the first plurality of spiking signals from the input spiking neural network; a first inhibitory neuron layer; a second excitatory neuron layer; and a second inhibitory neuron layer connected to the second excitatory neuron layer, the first excitatory neuron layer being configured to supply spiking signals to: the first excitatory neuron layer; the first inhibitory neuron layer; and the second excitatory neuron layer, the first inhibitory neuron layer being configured to supply spiking signals to the first excitatory neuron layer, the second excitatory neuron layer being configured to supply spiking signals to: the second excitatory neuron layer; the second inhibitory neuron layer; and the readout neural layer, and the second inhibitory neuron layer being configured to supply spiking signals to the second excitatory neuron layer.

The input spiking neural network may include a plurality of input neurons arranged in a grid, wherein the first excitatory neuron layer may include a plurality of first excitatory neurons arranged in a grid, the plurality of first excitatory neurons including a plurality of critical neurons uniformly distributed in the grid, and wherein the plurality of input neurons may be connected to the critical neurons to maintain spatial relationships between the input neurons in corresponding ones of the critical neurons.

The first excitatory neuron layer may include a plurality of excitatory neurons arranged in a grid, and a neuron of the first excitatory neuron layer may be configured to supply spiking signals to neurons in a local neighborhood of the grid around the neuron.

The first excitatory neuron layer may include a plurality of first excitatory neurons arranged in a grid, the second excitatory neuron layer may include a plurality of second excitatory neurons arranged in a grid, and the plurality of first excitatory neurons may be connected to the second excitatory neurons to maintain spatial relationships between the first excitatory neurons in corresponding ones of the second excitatory neurons.

According to one embodiment of the present invention, a system configured to identify a target in a synthetic aperture radar signal includes: a feature extractor configured to extract a plurality of features from the synthetic aperture radar signal; an input spiking neural network configured to encode the features as a first plurality of spiking signals; a multi-layer recurrent neural network configured to compute a second plurality of spiking signals based on the first plurality of spiking signals; a readout neural layer configured to compute a signal identifier based on the second plurality of spiking signals; and an output configured to output the signal identifier, the signal identifier identifying the target.

The plurality of features may include an amplitude of the synthetic aperture radar signal.

The plurality of features may include a phase of the synthetic aperture radar signal.

The readout neural layer may include a linear classifier.

The input spiking neural network, the multi-layer recurrent neural network, and the readout neural layer may be implemented by a neuromorphic chip.

The readout neural layer may be configured to compute average spiking rates from the second plurality of spiking signals, wherein the signal identifier may be computed based on the average spiking rates.

The multi-layer recurrent neural network may include: a first excitatory neuron layer configured to receive the first plurality of spiking signals from the input spiking neural network; a first inhibitory neuron layer; a second excitatory neuron layer; and a second inhibitory neuron layer connected to the second excitatory neuron layer, the first excitatory neuron layer being configured to supply spiking signals to: the first excitatory neuron layer; the first inhibitory neuron layer; and the second excitatory neuron layer, the first inhibitory neuron layer being configured to supply spiking signals to the first excitatory neuron layer, the second excitatory neuron layer being configured to supply spiking signals to: the second excitatory neuron layer; the second inhibitory neuron layer; and the readout neural layer, and the second inhibitory neuron layer being configured to supply spiking signals to the second excitatory neuron layer.

The input spiking neural network may include a plurality of input neurons arranged in a grid, wherein the first excitatory neuron layer comprises a plurality of first excitatory neurons arranged in a grid, the plurality of first excitatory neurons comprising a plurality of critical neurons uniformly distributed in the grid, and wherein the plurality of input neurons are connected to the critical neurons to maintain spatial relationships between the input neurons in corresponding ones of the critical neurons.

The first excitatory neuron layer may include a plurality of excitatory neurons arranged in a grid, and a neuron of the first excitatory neuron layer may be configured to supply spiking signals to neurons in a local neighborhood of the grid around the neuron.

The first excitatory neuron layer may include a plurality of first excitatory neurons arranged in a grid, the second excitatory neuron layer may include a plurality of second excitatory neurons arranged in a grid, and the plurality of first excitatory neurons may be connected to the second excitatory neurons to maintain the spatial relationships between the first excitatory neurons in corresponding ones of the second excitatory neurons.

According to one embodiment of the present invention, a system for identifying a target in a synthetic aperture radar signal includes: means for extracting a plurality of features from the synthetic aperture radar signal; means for encoding the features as a first plurality of spiking signals; means for supplying the spiking signals to a multi-layer recurrent neural network to compute a second plurality of spiking signals; means for computing a signal identifier based on the second plurality of spiking signals; and means for outputting the signal identifier from the readout neural layer, the signal identifier identifying the target.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
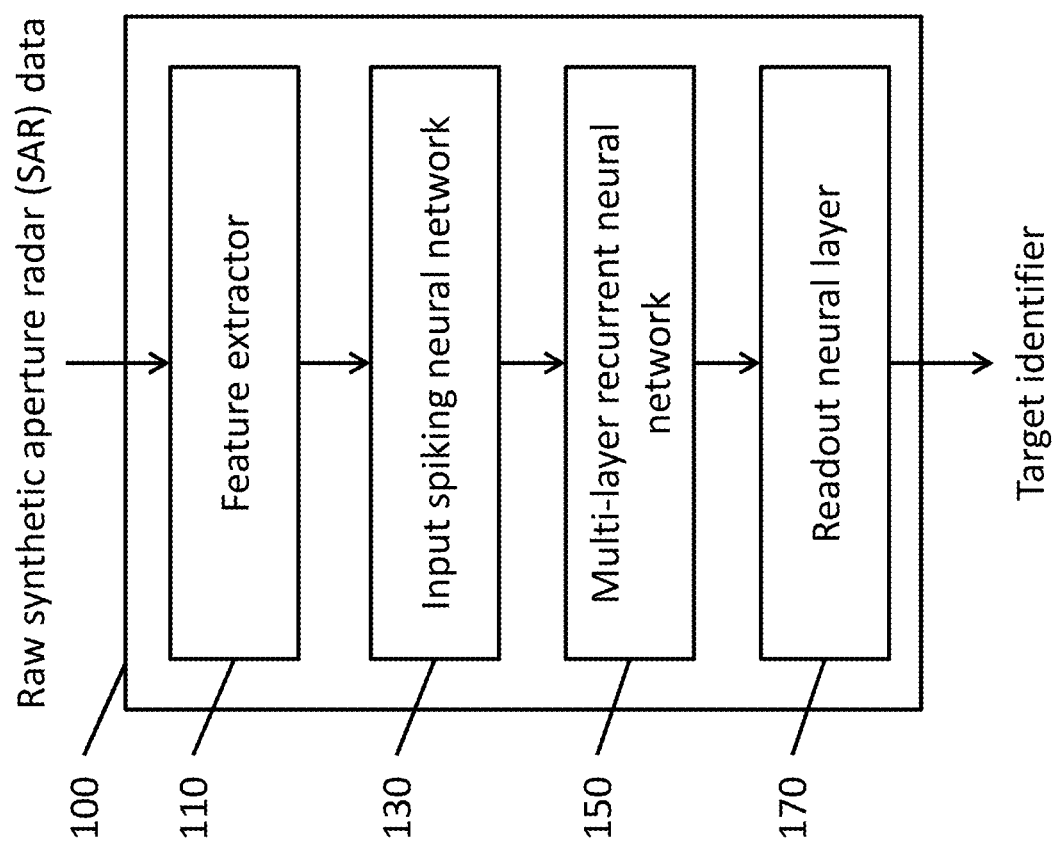
FIG. 1 is a block diagram of a system for identifying or classifying a target in raw synthetic aperture radar (SAR) data according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Synthetic aperture radar (SAR) data is widely used in both civilian and military applications, such as geographic survey, target recognition, and surveillance. As discussed above, typical SAR based systems perform target recognition by first generating an image from the received raw SAR data (or phase history data), and then performing target recognition on the image, such as by displaying the synthesized image to a human. The image synthesis process is generally computationally intensive (e.g., performing a convolution operation over a large amount of two-dimensional and/or three-dimensional data), and therefore real-time SAR image formation requires large size, weight, and power consumption (SWAP) processing hardware which is not suitable for many applications and platforms, or which may require offline (e.g., batch, rather than real-time, processing). This makes it difficult to apply image formation techniques in real-time, especially in environments where SWAP are constrained, such as in an unmanned aerial vehicle (UAV). Furthermore, image synthesis process is a transformation that does not add any new information about the targets. Therefore, the raw SAR data contains the same information as the synthesized SAR image data.

Therefore aspects of embodiments of the present invention are directed to systems and methods for recognizing targets from raw SAR data without an intermediate step of synthesizing images from the raw SAR data. Because image synthesis does not add any new information, aspects of embodiments of the present invention relate to automated target recognition systems that do not require an image to be synthesized from the raw SAR data. Aspects of embodiments of the present invention enable the recognition of targets from SAR data in real-time and with reduced power consumption, which may be particularly useful for applications with particular performance requirements and power constraints. In some embodiments of the present invention, at least some aspects are implemented in a neuromorphic chip, which can operate at high performance and with low power consumption.

Aspects of embodiments of the present invention relate to a signal recognition system configured to identify or classify a target found in raw SAR data utilizing a spiking neuromorphic network that generates spiking sequences based on features computed from complex raw SAR data, such as phase and amplitude. For example, the system may be configured to identify whether the raw SAR data was reflected off a particular type of aircraft (e.g., distinguishing between specific models of aircraft), or a particular model of a car (e.g., a Toyota Camry versus a Honda Accord versus a Jeep). A system for using a spiking neuromorphic network for analyzing raw SAR data is described in U.S. patent application Ser. No. 15/784,841, "System and Method for Synthetic Aperture Radar Target Recognition Utilizing Spiking Neuromorphic Networks" filed in the United States Patent and Trademark Office on Oct. 16, 2017, the entire disclosure of which is incorporated by reference herein.

Neuromorphic computing is a biologically-inspired approach based on observations that the human brain is able to compute complex functions while utilizing a very small amount of power. For example, the human brain has excellent capabilities in object recognition. In some neuromorphic computing devices, the physical hardware of the device implements electronic "neurons" that communicate with one another through spiking sequences (e.g., voltage pulses), in a manner that resembles the spiking sequences of signals between neurons in a human brain.

As such, one approach to applying neuromorphic computing to object learning and recognition is to encode features of the input data in the spiking signal domain. A binary spiking neural network may be computationally more efficient (e.g., energy efficient) than a real-valued neural network because processing spiking signals (binary sequences) consumes much less power than processing real-valued signals. Therefore, in some embodiments of the present invention, recognizing SAR targets utilizing a spiking neural network will greatly improve efficiency of power consumption and accuracy of target recognition than a comparable real-valued neural network.

Aspects of embodiments of the present invention relate to a target recognition system that is configured to recognize different targets from raw SAR data (e.g., phase history data) using a multi-layer recurrent spiking neural network for capturing different spatial-temporal patterns in the raw SAR data. In some embodiments, the neural network includes local recurrent neural connections, which are able to capture at least some spatial-temporal correlations and patterns in the data.

Some aspects of embodiments of the present invention relate to the use of spike-time-dependent plasticity (STDP) to perform unsupervised training on the multi-layer recurrent spiking neural network, where the unsupervised training process causes the neural network to self-organize to perform the target recognition function based on raw SAR feature data without forming SAR images, as described in more detail below.

FIG. 1 is a block diagram of a system for identifying or classifying a target in raw synthetic aperture radar (SAR) data according to one embodiment of the present invention. As shown in FIG. 1, in one embodiment, a system 100 for identifying or classifying a target includes: a feature extractor 110 that is configured to extract features from raw SAR data; an input spiking neural network 130 configured to encode the extracted SAR features as spiking sequences; a multi-layer recurrent neural network 150; and a readout neural layer 170, which includes a classifier (e.g., a linear classifier trained using a supervised training method such as a rank-1 learning technique) that is configured to classify different SAR targets from spiking sequences generated from the SAR features, and to output an identification of the target (a "target identifier"). The readout layer may be trained by a supervised learning technique. Experimental results show that implementations of embodiments of the present invention are effective in classifying targets from raw SAR data.

As such, aspects of embodiments of the present invention relate to classifying SAR targets utilizing a spiking neural network that is very efficient in power consumption; and/or classifying SAR targets without forming SAR images.

Figure 2:
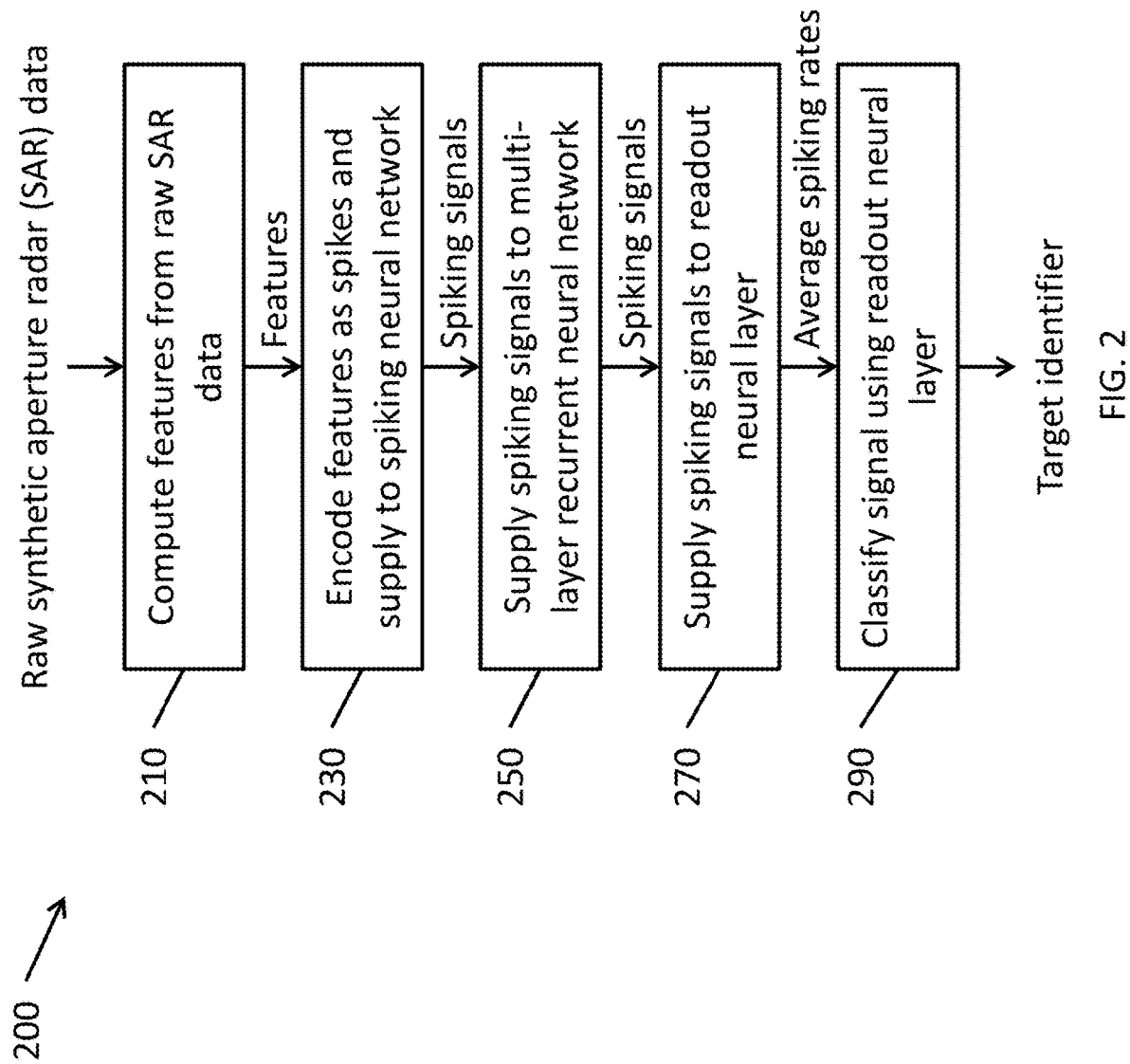
FIG. 2 is a flowchart illustrating a method for identifying or classifying a target in raw synthetic aperture radar (SAR) data according to one embodiment of the present invention.

FIG. 2 is a flowchart illustrating a method 200 for identifying or classifying a target in raw synthetic aperture radar (SAR) data according to one embodiment of the present invention.

Synthetic Aperture Radar (SAR) Features

One commonly used data format for raw synthetic aperture radar (SAR) data is phase history data, represented as a two-dimensional (2D) array of complex numbers of reflected RF signals from the targets. One dimension of the array represents frequency bins while the other dimension represents the number of received radar pulses. Because a SAR sensor generally covers a large area, raw SAR data is typically a very large 2D array of complex numbers.

According to one embodiment, in operation 210, the feature extractor 110 receives synthetic aperture radar (SAR) raw data (e.g., from a radar antenna), and computes features from the SAR raw data. The 2D complex phase history raw SAR data does not have an intuitive or natural mapping to spiking signals. In some embodiments of the present invention, four different features are computed from raw SAR data: amplitude, off-amplitude, positive phase, and negative phase.

Figure 3:
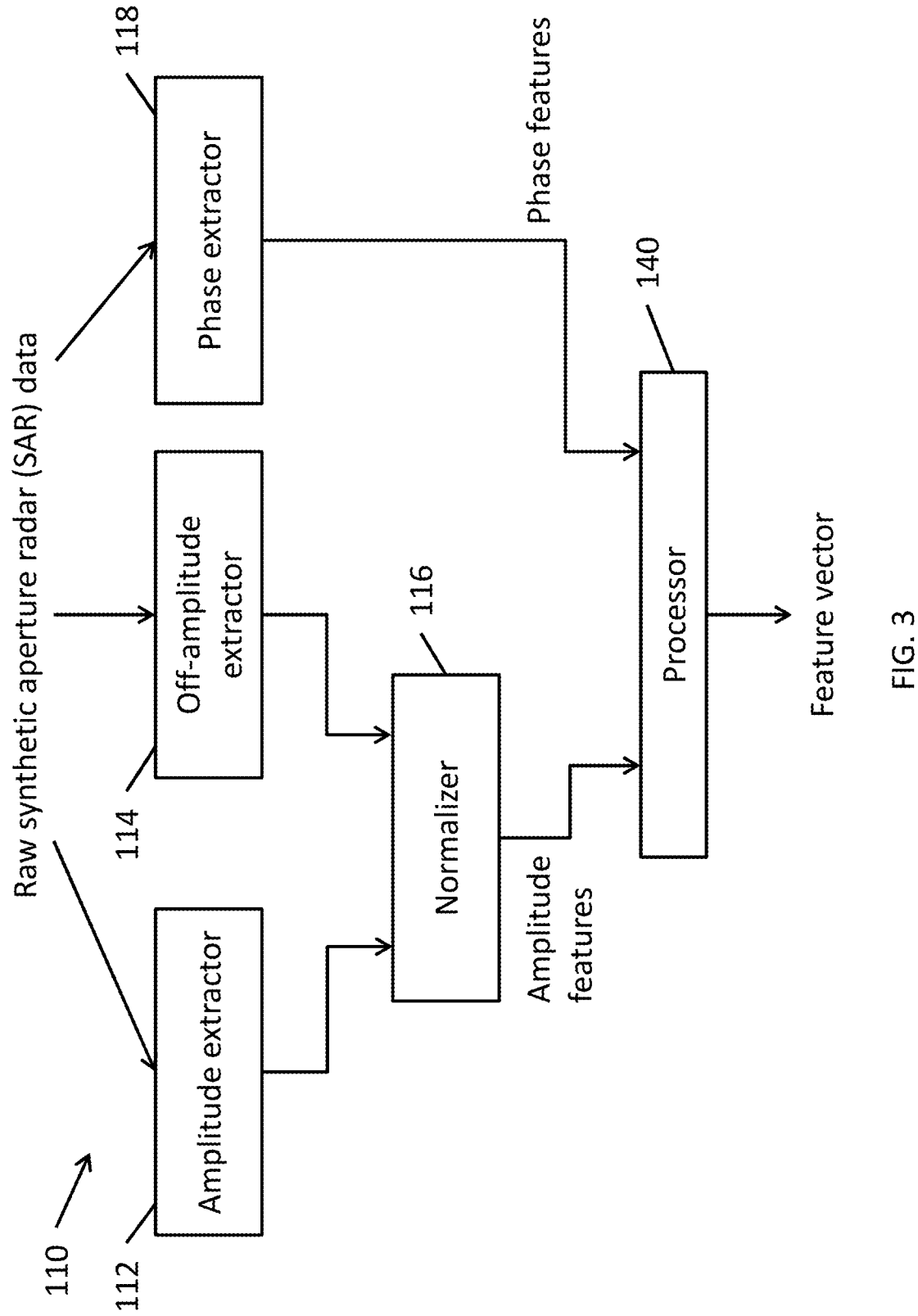
FIG. 3 is a block diagram of a feature extractor according to one embodiment of the present invention configured to compute features from raw SAR data.

FIG. 3 is a block diagram of a feature extractor 110 according to one embodiment of the present invention configured to compute features from raw SAR data.

Figure 4:
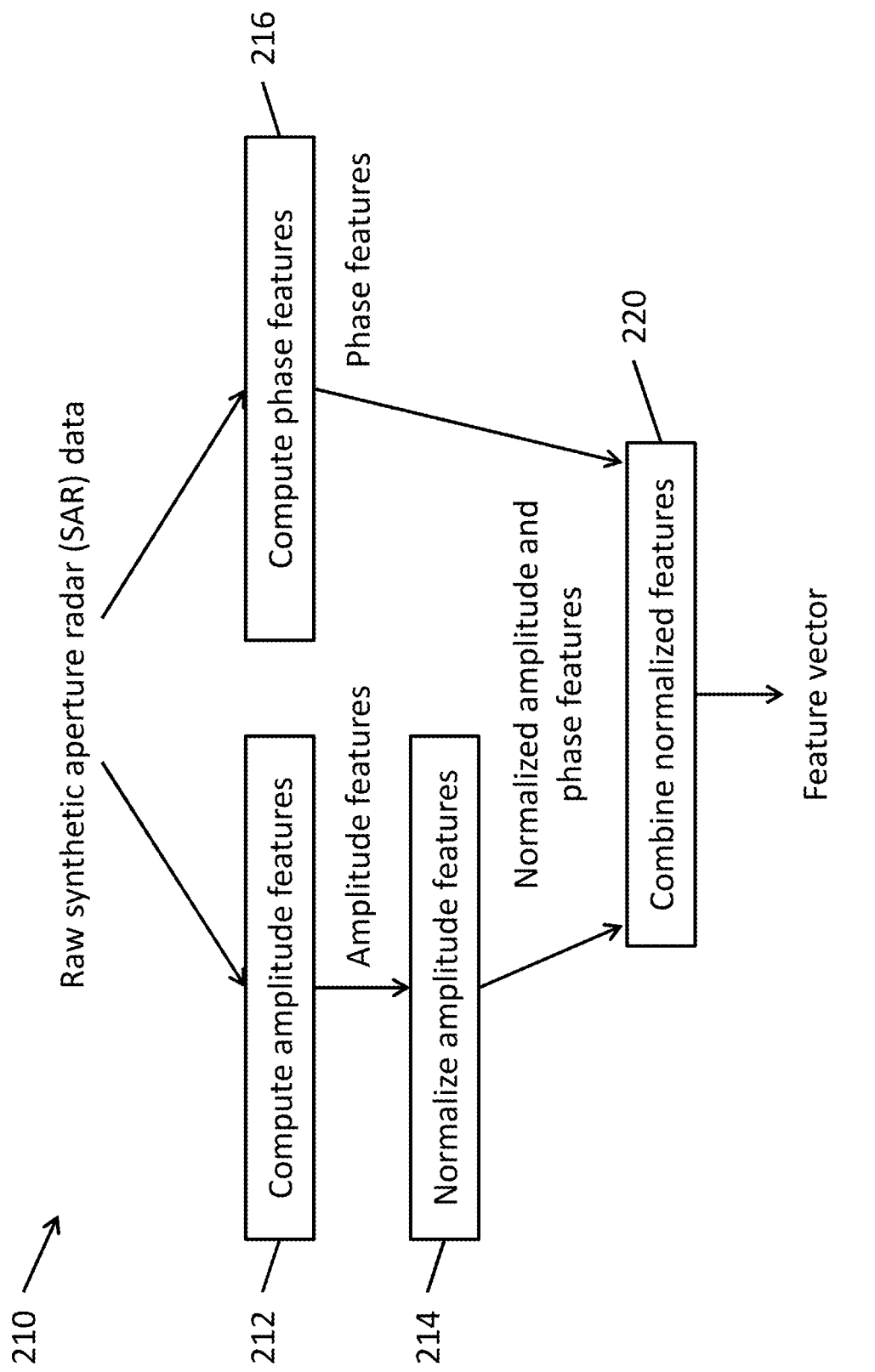
FIG. 4 is a flowchart illustrating a method 210 for computing features from a segment of the raw SAR data according to one embodiment of the present invention.

FIG. 4 is a flowchart illustrating a method 210 for computing features from a segment of the raw SAR data according to one embodiment of the present invention.

According to some embodiments of the present invention, the feature extractor 110 divides the 2D array of raw SAR feature data into a sequence of subsets (or time windows) of the 2D array. Using a sequence of 2D subsets (or time windows) to represent the 2D SAR array enables embodiments of the present invention to: capture some spatial relationships and/or patterns presented in raw SAR data; utilize the memory property of recurrent spiking neural networks to capture the temporal correlations presented in the sequence of 2D subsets; process the raw SAR data in real-time or substantially real-time because, in practice, raw SAR data is generally obtained as a sequence of 2D RF signals.

Given that the raw SAR data is a matrix or two-dimensional (2D) array of complex values, the data point of the SAR data s(i,j) at position (i,j) in the two-dimensional array is given by s(i,j)=a(i,j)+jb(i,j) (where the coefficient j refers to the unit imaginary number j=$\sqrt{-1}$, the parameters i and j are indices into the two-dimensional array, and a(i,j) and b(i,j) respectively refer to the real and imaginary components of the data point at s(i,j)). In operation 212, the amplitude extractor 112 extracts the amplitude feature Am(i,j) for each data point s(i,j) (e.g., for each coordinate pair (i,j)) in accordance with Equation 1:

$$Am(i,j) = \sqrt{a(i,j)^2 + b(i,j)^2}$$

The off-amplitude extractor 114 extracts off-amplitude feature in accordance with Equation 2:

$$Am_{off}(i,j) = Am_{max} - Am(i,j)$$

The phase extractor 118 computes the phase values Ph(i,j) in operation 216 for each data point s(i,j)=a(i,j)+jb(i,j) in accordance with Equation 3:

$$Ph(i,j) = \tan^{-1}\left(\frac{b(i,j)}{a(i,j)}\right)$$

The raw SAR feature point is given in Equation 4 as:

$$Ft(i,j) = \begin{bmatrix} Am(i,j) \\ Am_{off}(i,j) \\ Ph(i,j) \end{bmatrix}$$

Because the phase features Ph(i,j) have a range of [0.0, π], in one embodiment, in operation 214, the normalizer 116 normalizes the amplitude features Am(i,j) to the same dynamic range of [0.0, π]. As such, the normalized amplitude features $\overline{Am}(i,j)$ are given by Equation 5:

$$\overline{Am}(i,j) = \pi * \frac{Am(i,j)}{Am_{max}}$$

such that the normalized raw SAR feature point is given by Equation 6 as:

$$\begin{bmatrix} \overline{Am}(i,j) \\ \overline{Am_{off}}(i,j) \\ Ph(i,j) \end{bmatrix}$$

Because the raw SAR data is a 2D complex array, the feature vectors can be arranged based on row data points or column data points to generate a sequence of feature vectors for the raw data array. Defining $F_{Am}$ to be a 2D vector of size M×N (M rows by N columns) of the amplitude features Am(i,j) (or the normalized features $\overline{Am}_{i,j}$) and defining $F_{Ph}$ to be a 2D vector of size M×N of the phase features Ph, a 2D SAR feature vector $F_{SAR}$ of size 2M×N is constructed in operation 220 as shown in Equation 7:

$$F_{SAR} = \begin{bmatrix} F_{Am} \\ F_{Ph} \end{bmatrix}$$

Both the $F_{Am}$ and $F_{Ph}$ are subsets of the original 2D amplitude and phase arrays computed from the raw SAR data. A raw SAR data set is represented by a sequence of 2D SAR feature vectors.

Spiking Neural Networks

Recurrent neural networks have the capability to capture the spatial-temporal correlations and/or patterns in the input data, and multi-layer recurrent neural networks have the potential to represent the spatial-temporal correlations/patterns of the input data in different abstraction levels, which is a desired property for classifying complicated targets.

In some embodiments of the present invention a neuromorphic spiking network is implemented by a general purpose processor (CPU) 140 or a general purpose graphics processing unit (GPU) 140 configured to simulate the input layer 130, the multi-layer recurrent neural network 150 (including the first excitatory neuron layer E1 152, the first inhibitory neuron layer I1 154, the second excitatory neuron layer E2 156, and the second inhibitory neuron layer I2 158), the readout layer 170, and the connections within and between the layers. In some embodiments, the neuromorphic spiking network is implemented by a neuromorphic chip such as a neuromorphic chip produced by HRL Laboratories of Malibu, Calif., or the TrueNorth neural net chip produced by International Business Machines Corporation (IBM) of Armonk, N.Y. In circumstances of limited size, weight, and power (SWAP), a neuromorphic chip may provide reduced SWAP in comparison to a general purpose processor. In some embodiments of the present invention, such as in a production device, where a set of weights W and/or other parameters of the neural network has already been determined through the training process, the neural network can be implemented utilizing a dedicated circuit based on the fixed parameters. The dedicated circuit may be, for example, a field programmable gate array (FPGA) or an application specific integrated circuit (ASIC).

Figure 5:
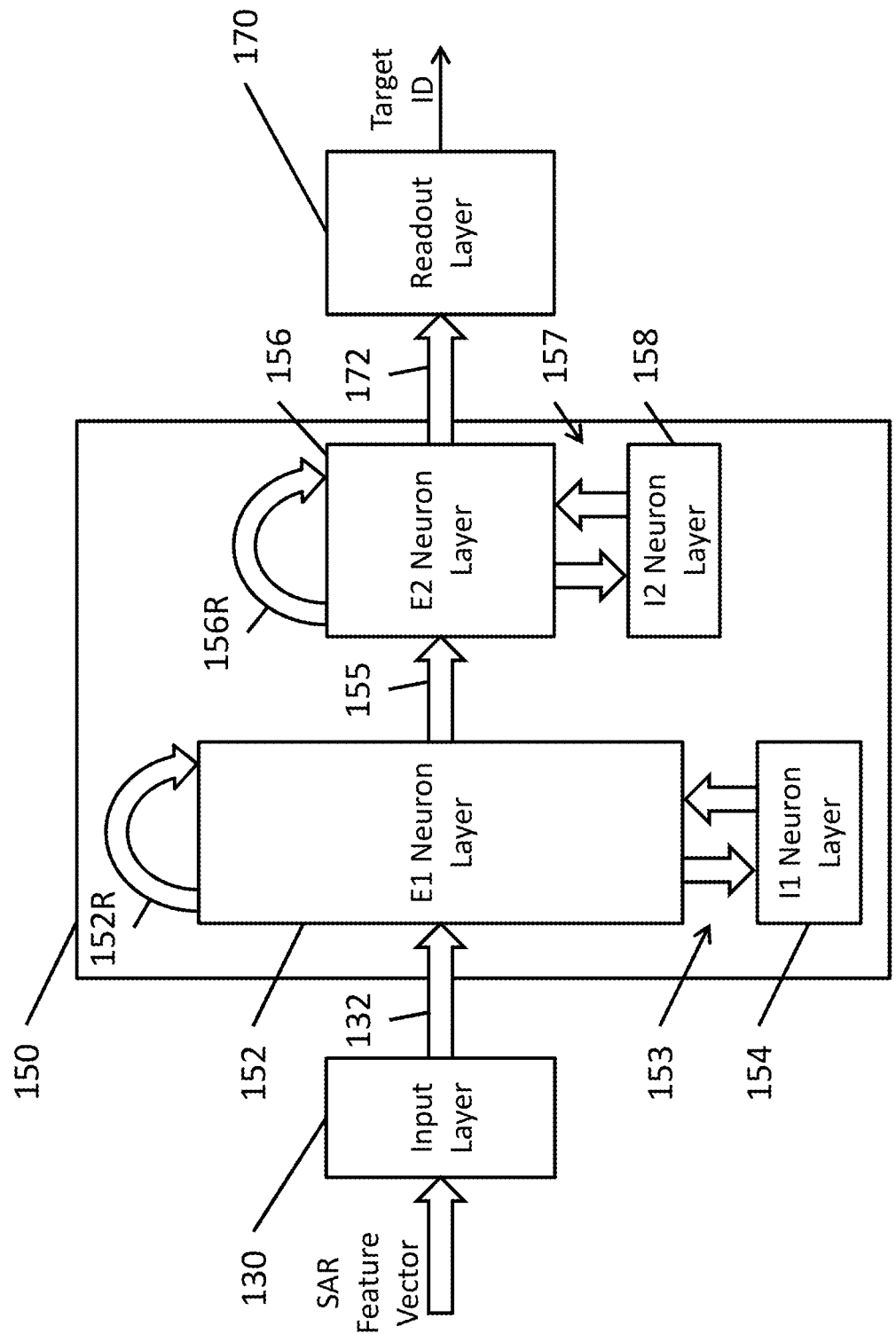
FIG. 5 is a schematic diagram of a neuromorphic spiking network according to one embodiment of the present invention.

FIG. 5 is a schematic diagram of a neuromorphic spiking network according to one embodiment of the present invention. As shown in FIG. 5, the neuromorphic spiking network includes the input layer 130, which encodes received SAR feature vectors as input spiking signals. The input spiking signals are supplied through connections 132 to a multi-layer recurrent neural network 150, which generates a plurality of output spiking sequences. The readout layer 170 computes a target identifier (or target ID) based on the output spiking sequences received through connections 172 from the multi-layer recurrent neural network 150, where the target identifier identifies a target that was detected in the raw SAR data that was supplied as input to the system.

In one embodiment, in operation 230, each value of a real-valued feature vector is converted into a corresponding spiking sequence generated by a corresponding input neuron of the input spiking neural network 130. As such, according to one embodiment, the size of the input spiking neural network 130 (e.g., the number of neurons in the input spiking neural network 130) is equal to the number of features in the input 2D feature vector.

Each spiking sequence generated by each input neuron is made up of spikes that are randomly (or pseudo-randomly) generated in accordance with a Poisson distribution or exponential distribution having a mean spiking rate that corresponds to the value of its corresponding feature (e.g., a value in the normalized range of [0, π]). The exponential distribution may be used as a computationally simpler approximation of the Poisson distribution. In particular, the real values of the feature vector are treated as average (e.g., mean) values of the distribution, and a random number generator is used to produce spikes such that the randomly generated spiking sequences have mean values corresponding to the values of the feature vector. For example, if each feature vector $F_{SAR}$, included 2M×N different features, those features would be converted into 2M×N different spiking sequences, each spiking sequence having a spiking rate distribution in accordance with the real value of the corresponding feature.

More precisely, according to one embodiment, if $F_{SAR}(i,j)$ is the real feature value (computed from the raw SAR data in operation 210) supplied as input to a neuron at position (i,j) in the input layer 130, in operation 230, a random number k is generated (e.g., by a random number generator) for a simulation time point t, where k is generated with the exponential distribution function of Equation 8:

$$f(t, \lambda) = \begin{cases} \lambda e^{-\lambda t}, & t \geq 0 \\ 0, & t < 0 \end{cases}$$

where $\lambda = F_{SAR}(i,j)$. The input layer neuron at position (i,j) of the input layer 130 generates a sequence of spikes, where the time interval between spikes is equal to the number k. When the input feature value λ changes, a new time interval k is generated in accordance with the exponential function $f(t,\lambda)$.

Because the values of the feature vector generally change over time (e.g., the values may differ from one vector (row vector or column vector) of the SAR data to the next), the generated spiking sequences may have varying mean values over time.

As shown in FIG. 5, in one embodiment of the present invention, the multi-layer recurrent neural network 150 includes a first excitatory neuron layer E1 152, a first inhibitory neuron layer I1 154, a second excitatory neuron layer E2 156, and a second inhibitory neuron layer I2 158. The multi-layer recurrent neural network 150 is configured, in part through an unsupervised training process, to categorize and cluster similar information from the feature vectors representing raw SAR data. The resulting clustered spikes are supplied to the readout layer to compute a classification of the target based on the output of the multi-layer recurrent neural network 150.

In the multi-layer recurrent neural network 150 shown in FIG. 5, each neuron receives synaptic signals or "spikes" from other neurons and releases synaptic signals (other "spikes") to other neurons. In some embodiments, each neuron is modeled by the integrate-and-fire model, where a neuron is modeled as a capacitor C in parallel with a resistor R driven by a current I(t). In a leaky integrate-and-fire model, the neuron firing (e.g., emission of a spike) is described by the dynamic equation of a neuron membrane potential and current, as given by Equation 9, below:

$$\tau_m \frac{du(t)}{dt} = -u(t) + RI(t)$$

where u(t) is the membrane potential (e.g., the voltage across the capacitor C), I(t) is the membrane current, and the constants $\tau_m$ and R are the membrane time constant and resistance of the neuron, respectively. When the membrane potential u(t) is greater than or equal to a firing threshold $V_{th}$ at time $t_f$, the neuron outputs a spike which is scaled by the connection weight wδ(t–$t_f$) (in the case of an inhibitory neuron, the spike has the opposite sign from the excitatory neuron, e.g., –wδ(t–$t_f$)), and, after firing, the capacitor C is reset (e.g., set to zero volts by shorting the capacitor to ground). The firing thresholds $V_{th}$ for the excitatory neurons and the inhibitory neurons are different and determined by a parameter search procedure, as described in U.S. patent application Ser. No. 15/784,841, "System And Method for Synthetic Aperture Radar Target Recognition Utilizing Spiking Neuromorphic Networks," the entire disclosure of which is incorporated by reference herein. According to one embodiment, the length of the spike δ is equal to one time step (e.g., one sample).

Qualitatively, as input signals (e.g., spikes or the input values from the feature vector) arrive at the input of the neuron, the spikes accumulate over time in a capacitor C. The "leakiness" of the neuron causes the accumulated voltage at the capacitor C to decrease over time. However, if sufficient spiking energy arrives at the neuron (e.g., spikes can arrive at various rates and with various voltages and/or widths), then the voltage at the capacitor C may eventually exceed the threshold voltage $V_{th}$, at which point the neuron fires by emitting a spike on its output, and by resetting the capacitor to an initial voltage.

Figure 6:
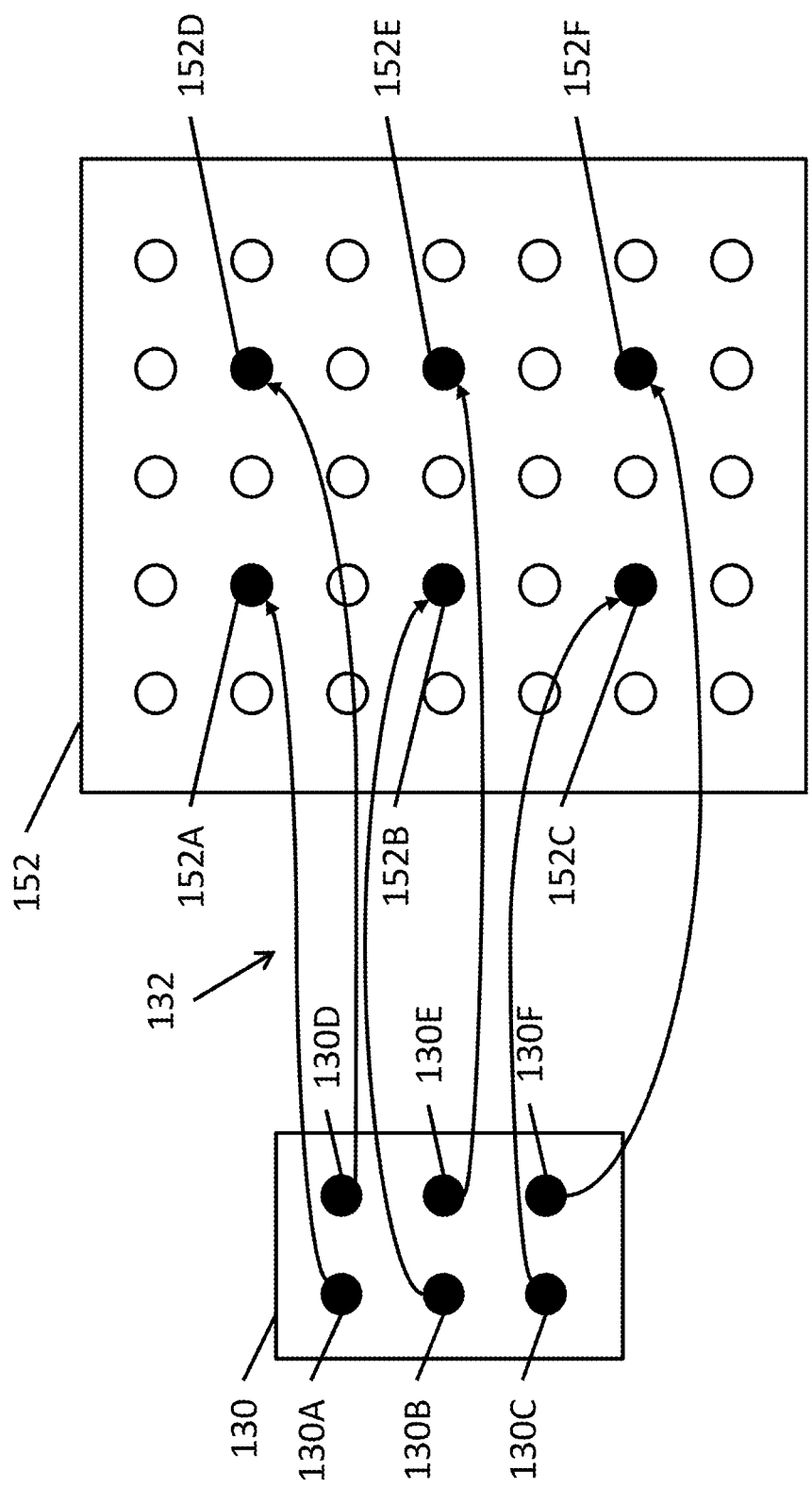
FIG. 6 is a schematic diagram of neurons in a portion of the input layer and their connections to neurons in a corresponding portion of the first excitatory neuron layer E1 in accordance with one embodiment of the present invention.

FIG. 6 is a schematic diagram of neurons in a portion of the input neural layer 130 and their connections to neurons in a corresponding portion of the first excitatory neuron layer E1 152 of the multi-layer recurrent neural network 150 in accordance with one embodiment of the present invention. In some embodiments, the first excitatory neuron layer E1 152 is larger than the input layer 130, and the connections 132 between the input layer 130 and the first excitatory neuron layer E1 152 are on a one-to-one basis (e.g., one neuron of the input layer 130 to one corresponding "critical" neuron of the first excitatory neuron layer E1 152) with fixed synaptic weights (e.g., in some embodiments, there is no need to learn or modify these weights because the function of connections 132 is to pass the spikes generated by the input layer 130 to the multi-layer recurrent neural network 150). As shown in FIG. 6, each neuron of the input layer 130 and the first excitatory layer E1 152 is associated with a position (e.g., in a square grid) within its respective excitatory layer. In one embodiment, the critical neurons on the first excitatory neuron layer E1 152 are uniformly distributed (e.g., they are located on a uniform sub-sampling grid on the first excitatory neuron layer E1 152).

For example, the six neurons of the portion of the input layer 130 depicted in FIG. 6 supply input spiking signals (corresponding to the real values of the features) through connections 132 to corresponding "critical" neurons (shown in FIG. 6 as filled-in circles) of the first excitatory neuron layer E1 152. As shown in FIG. 6, the critical neurons are spaced apart and appear in every other row and in every other column of the grid of the first excitatory neuron layer E1 152. In addition, as seen in FIG. 6, the spatial relationships between adjacent neurons of the input layer 130 are maintained or preserved in the corresponding critical neurons on the first excitatory neuron layer E1 152. For example, input layer neuron 130A in the upper left portion of the input layer 130 is connected to critical neuron 152A in the upper left portion of the first excitatory neuron layer E1 152. Input neuron 130A is located immediately above input neuron 130B and immediately to the left of input neuron 130D. Likewise, critical neuron 152A is the next critical neuron above critical neuron 152B and is the next critical neuron to the left of critical neuron 152D. As another example, input neuron 130B is between input neurons 130A and 130C and, likewise, corresponding critical neuron 152B is between critical neurons 152A and 152C. Similarly, input neuron 130E is to the right of input neuron 130D and between input neuron 130D and input neuron 130F, and likewise critical neuron 152E is to the right of critical neuron 152B and between critical neuron 152D and critical neuron 152F.

Figure 7:
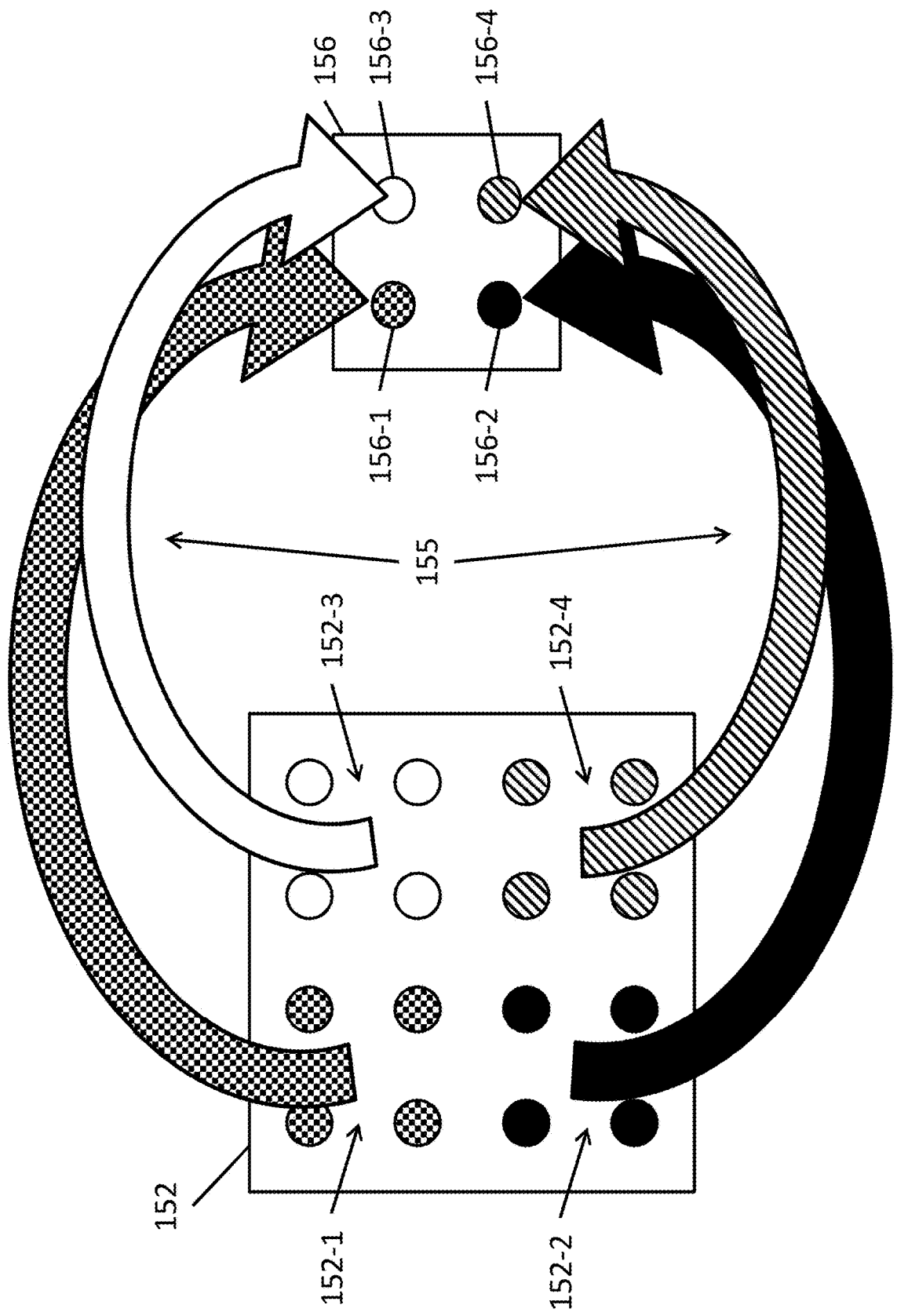
FIG. 7 is a schematic diagram of neurons in a portion of the first excitatory layer E1 and their connections to neurons in a corresponding portion of the second excitatory neuron layer E2 of the recurrent neural network in accordance with one embodiment of the present invention.

FIG. 7 is a schematic diagram of neurons in a portion of the first excitatory layer E1 152 and their connections 155 to neurons in a corresponding portion of the second excitatory neuron layer E2 156 of the multi-layer recurrent neural network 150 in accordance with one embodiment of the present invention. In some embodiments, the second excitatory neuron layer E2 156 is smaller than the first excitatory neuron layer E1 152. The connections 155 from the first excitatory neuron layer E1 152 to the second excitatory neuron layer E2 156 form a "many-to-one" structure where multiple adjacent neurons from the first excitatory neuron layer E1 152 are connected to a single neuron in the second excitatory neuron layer E2 156. In some embodiments, the connections 155 are fixed weight connections (e.g., not learned during a training process). For example, as shown in FIG. 7, in one embodiment, groups of four adjacent neurons of the first excitatory neuron layer E1 152 are connected to (e.g., supply their outputs to) a single corresponding neuron of the second excitatory neuron layer E2 156. More specifically, in the example shown in FIG. 7, the four neurons 152-1 of the first excitatory neuron layer E1 are connected to a single neuron 156-1 of the second excitatory neuron layer E2, the four neurons 152-2 of the first excitatory neuron layer E1 are connected to a single neuron 156-2 of the second excitatory neuron layer E2, the four neurons 152-3 of the first excitatory neuron layer E1 are connected to a single neuron 156-3 of the second excitatory neuron layer E2, and the four neurons 152-4 of the first excitatory neuron layer E1 are connected to a single neuron 156-4 of the second excitatory neuron layer E2. However, embodiments of the present invention are not limited thereto and may include larger or differently sized groups of adjacent neurons (e.g., a 3×3 group, a 3×2 group, or a 1×4 group of neurons from first excitatory neuron layer E1 152 may be connected to a single neuron of the second excitatory neuron layer E2 156). In addition, in some embodiments, adjacent neurons in the second excitatory neuron layer E2 156 may receive inputs from overlapping adjacent groups of neurons of the first excitatory neuron layer E1 152.

The connections 155 between the first excitatory neuron layer E1 152 and the second excitatory neuron layer E2 156 maintain the spatial relationship of the information from the neurons of the first excitatory neuron layer E1 152 in the neurons of the second excitatory neuron layer E2 156. For example, in the first excitatory neuron layer E1 152, the first group of four neurons 152-1 of the first excitatory neuron layer E1 are above the second group of four neurons 152-2 and to the left of the third group of neurons 152-3. Likewise, in the second excitatory neuron layer E2 156, the first neuron 156-1 is above the second neuron 156-2 and to the left of the third neuron 156-3, where these neurons of the second excitatory neuron layer E2 156 are respectively connected to the first group of four neurons 152-1, the second group of four neurons 152-2, and the third group of four neurons 152-3 of the first excitatory neuron layer 152.

Accordingly, the second excitatory neuron layer E2 156 can be thought of as a summary of a group of signals (e.g., summary of the outputs of adjacent neurons) of the first excitatory neuron layer E1 152, and the spiking sequences may be closely correlated to each other.

Figure 8:
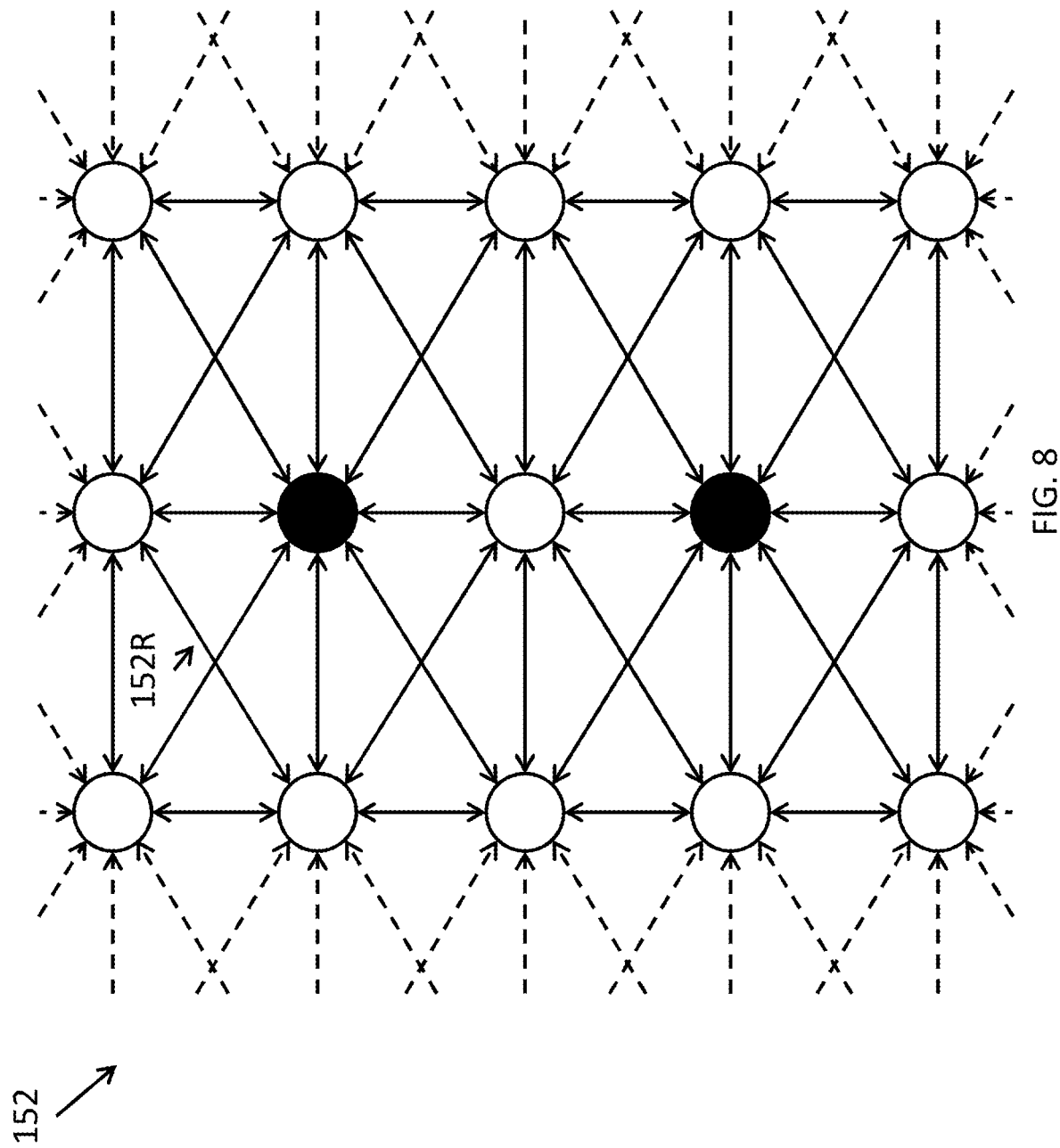
FIG. 8 presents an example of the local connections in a portion of an excitatory neuron layer according to one embodiment of the present invention.

The neurons within the first excitatory neuron layer 152 are also connected to one another over local connections 152R. Likewise, the neurons within the second excitatory neuron layer 156 are connected to one another over local connections 156R. FIG. 8 is a schematic diagram of a portion of the first excitatory neuron layer E1 152 according to one embodiment of the present invention.

According to one embodiment, excitatory neurons are connected to other excitatory neurons in both the first excitatory neuron layer E1 152 and the second excitatory neuron layer E2 156 layer by local neighborhood connections (e.g., connections to other neurons within their own layers), and their synaptic weights are determined by spike-time-dependent plasticity (STDP) learning, as described in more detail below. FIG. 8 presents an example of the local connections 152R in a portion of the first excitatory neuron layer E1 152 according to one embodiment of the present invention. In some embodiments of the present invention, similar local connections 156R connect the neurons of the second excitatory neuron layer E2 156.

As shown in FIG. 8, each neuron (e.g., the neuron shown in black) is bi-directionally connected to each of the eight adjacent neurons. In other words, each neuron is configured to transmit spiking signals to each of the eight adjacent neurons (upper left, upper center, upper right, right, lower right, lower center, lower left, and left). The local neighborhood connections 152R and 156R form the recurrent computing structure of the multi-layer recurrent neural network 150, where various portions of the network 150 receive signals originating from previous time points (e.g., spiking signals computed from earlier received raw SAR data) and combine these signals with current spiking signals.

Referring back to FIG. 5, the multi-layer recurrent neural network 150 also includes a first inhibitory neuron layer I1 154 connected to the first excitatory neuron layer E1 152 through connections 153 and a second inhibitory neuron layer I2 158 connected to the second excitatory neuron layer E2 156 through connections 157. The first inhibitory neuron layer I1 154 and the second inhibitory neuron layer I2 158 function to stabilize the neuron firing rates within the multi-layer recurrent neural network 150.

The connections 153 include a first set of connections from neurons in the first excitatory neuron layer 152 to neurons in the first inhibitory neuron layer 154, where the number of connections is set based on a connection ratio parameter (a connection probability) (described in more detail below), where the connections are selected based on a uniformly random distribution (e.g., each neuron in the first excitatory neuron layer 152 is connected to a set of neurons uniformly randomly selected from the first inhibitory neuron layer 154). Similarly, the connections 153 further include a second set of connections from neurons in the first inhibitory neuron layer 154 to the first excitatory neuron layer 152, where the number of connections is set based on another connection ratio parameter, where the connections are selected based on a uniformly random distribution. The synaptic weights of these random connections 153 are set (or learned) using spike-time-dependent plasticity (STDP) learning, as described in more detail below.

The connections 157 between the second excitatory neuron layer 156 and the second inhibitory neuron layer 158 are substantially similar to the connections 153 between the first excitatory neuron layer 152 and the first inhibitory neuron layer 154, and the number of connections may be controlled by a corresponding set of connection ratio parameters. The synaptic weights of these connections 157 are also set (or learned) using spike-time-dependent plasticity (STDP) learning, as described in more detail below.

According to some embodiments of the present invention, the connections 172 between the second excitatory neuron layer E2 156 and the readout layer 170 is a full-connection structure, in which every neuron in the second excitatory neuron layer E2 156 is connected to every neuron in the readout layer 170. In some embodiments, the synaptic weights of the connections 172 are determined through a supervised learning method, where the readout layer 170 is configured to operate as a linear classifier.

Network Training using Unsupervised Learning

Some aspects of embodiments of the present invention relate to training or determining the weights of the connections 152R, 153, 156R, and 157 in an unsupervised manner, in order to prepare the multi-layer recurrent neural network 150 for the task of target classification. In some aspects of embodiments of the present invention, spike-time-dependent plasticity (STDP) learning is used to organize the multi-layer recurrent neural network 150 into hierarchical clusters that may facilitate the target classification process.

During STDP learning, if $t_{pre}$ and $t_{post}$ are, respectively, the spiking times for a pre-synaptic spike and a post-synaptic spike, the corresponding synaptic weight ("synaptic conductance") is computed with respect to Equations (10), (11), and (12) below:

$$g_{new} = g_{old} + \Delta g$$

$$\Delta g = g\_max * F(\Delta t)$$

$$F(\Delta t) = \begin{cases} A_+ * \exp\left(\dfrac{\Delta t}{\tau_+}\right) & \text{if } \Delta t < 0 \\ -A_- * \exp\left(\dfrac{\Delta t}{\tau_-}\right) & \text{if } \Delta t \geq 0 \end{cases}$$

where $\Delta t = t_{pre} - t_{post}$. The constants $A_+$ and $A_-$ determine the maximum amount of synaptic modification. The time constraints $\tau_+$ and $\tau_-$ determine the ranges of pre- to post-synaptic spike intervals. Qualitatively, the STDP learning rule is that, if a pre-synaptic spike can generate a post-synaptic spike immediately, the synaptic weight is increased; otherwise, it is decreased. As a result, a high value in a synaptic weight refers to that the two neurons connected by the synaptic weight are closely coupled and are acting together. On the other hand, a small value in synaptic weight means that the activity of the two neurons have no impact on each other.

In some embodiments, to improve the efficiency of neurons, the synaptic weights of the multi-layer recurrent network are normalized after a given time period during the weight training process. More specifically, in some embodiments, for a given neuron (m, n), the function g(i,j,t) represents the synaptic weight of the connection from neuron (i,j) to neuron e(m,n) at time t. During an unsupervised STDP learning process, after a given learning time period (or normalization period) $T_n$ (e.g., the time between $t+T_n$ and $t+T_n+1$), the synaptic weights g are normalized to a set or predefined constant C in accordance with Equation 13:

$$g(i, j, t+1) = \begin{cases} \dfrac{C * g(i, j, t)}{\sum_{u,v} g(u, v, t)}, & t = kT_n, k = 1, 2, 3, \ldots \\ g(i, j, t+1), & \text{otherwise} \end{cases}$$

k=1, 2, 3, . . . .

In some embodiments, the normalization period $\tau_n$ is in the range of 50 ms to 100 ms.

Applying weight normalization in accordance with some embodiments of the present invention can mitigate or prevent quick weight saturation during the unsupervised learning process and thereby improve the utilization of every neuron in the network. This is because, if the synaptic weights of a neuron become saturated, that neuron is no longer useful in the learning process.

Accordingly, the unsupervised STDP learning process adjusts the weights w of the connections between neurons in the multi-layer recurrent neural network 150 to organize the neurons to cluster their spiking based on the input features (where the input features were computed directly from the raw SAR data). As noted above, the output of the multi-layer recurrent neural network 150 is supplied to a readout layer 170 through connections 172.

In operation 250, the features of the raw SAR data, encoded as spiking signals, are supplied to the multi-layer recurrent neural network 150 to generate another set of spiking signals, which are supplied in operation 270 to the readout layer 170 to compute a classification (e.g., identifying the type of vehicle appearing in the SAR data).

Readout Layer Training Using Supervised Learning

Some aspects of embodiments of the present invention relate to a readout layer 170, which plays the role of linear classification based on averaged spiking rates from the second excitatory neuron layer E2 156. For a given time period T (a presentation time of an input 2D feature vector to the input layer 130), the resulting average spiking rate of the second excitatory neuron layer E2 156 can be calculated in accordance with Equation 14:

$$r_{avg}(m, n) = \dfrac{1}{T} \sum_{t}^{T} spk(m, n, t)$$

where spk(m, n, t) is the spike generated by the neuron e(m, n) at time t. In some embodiments, the presentation time T is in the range of 200 ms to 500 ms.

The readout neural layer 150 maps the average spiking rates $r_{avg}(m,n)$ of the neurons of the second excitatory neuron layer E2 156 to a target class $c_i$ based on a plurality of classifier weights (e.g., the weights of the connections 172) arranged in a mapping weight matrix W in accordance with Equation 15:

$$c_i = Wr_i, i = 1, 2, 3, \ldots, M$$

where $r_i$ is a vector containing all averaged firing rates from all neurons in the output layer at time i, where M is the total number of time indices, where $c_i$ refers to a target class computed at time i. In other words, Equation 15 indicates that, at time index i, a vector of average firing rates $r_i$ from the second excitatory neuron layer E2 156 can be used to compute a target class $c_i$ at time i among K different classes. For example, when the network is configured to distinguish between three different types of vehicles (e.g., a Toyota Camry versus a Honda Accord versus a Jeep), then K=3 and each different type of vehicle corresponds to a different class c.

Some aspects of embodiments of the present invention relate to training or learning the synaptic weights (represented by matrix W) of the connections 172 from the second excitatory neuron layer E2 156 to the readout layer 170 using a supervised learning method (e.g., using labeled training data). Some embodiments of the present invention relate to the use of a Rank-1 learning rule to train these weights, where the Rank-1 learning rule is similar to a mean-squared learning rule.

Generally, the Rank-1 learning rule maps the training data into a subspace such that all of the common components in the training data are removed before utilizing the training data to train a classifier, where the mapping rule is generally learned from the training data. The training data, in this case, includes raw SAR data that are labeled based on the classifications such containing reflected signals from various types of vehicles (e.g., different models of cars and/or aircraft) and the like. The removal of the common components improves the efficiency of the training process, as components that do not provide information that helps in distinguishing between the various classes $c_k$ of signals need not be processed.

To remove the common components in the training vectors, the training vectors are mapped into a subspace by a signal sub-space mapping matrix A as shown in Equation 16:

$$A = A - k_i \frac{k_i^T}{\alpha_i}$$

where:

$$k_i = A r_i$$

$$\alpha_i = 1 + k_i r_i$$

where the signal sub-space mapping matrix A is learned from the training data during the training, where $k_i$ is a subspace vector computed from $r_i$, which is the i-th average spiking rate vector, as shown above in Equation 16 and $\alpha_i$ is a normalization constant.

Accordingly, the weight matrix W, which is the synaptic weights of the outputs of neuron e(m, n) of the second excitatory neuron layer E2 156 to the readout layer 170, can be updated in an iterative supervised learning process in accordance with Equation 17:

$$W = W - E_i \frac{k_i^T}{\alpha_i}$$

where the error signal $E_i$ is:

$$E_i = c_i - t_i$$

where $c_i$ is the computed output of readout network 170 based on the current synaptic weights W, and $t_i$ is the target label for the training.

As a result, in operation 290, the readout neural layer 150 outputs a signal identifier or target identifier $c_i$ that identifies the classification of the target found in the raw SAR data. For example, in an embodiment directed to reconnaissance, the signal identifier may identify the classification of the target in the SAR data as a car, a truck, or a tank.

Accordingly, some embodiments of the present invention are directed to a neural network, including a multi-layer recurrent neural network that is configured to detect the presence of targets within raw SAR data, classify the detected targets, and to output the resulting classifications.

In some embodiments, one or more of the input neural network 130, the multi-layer recurrent neural network 150, and the readout neural layer 150 may be implemented in an integrated device, such as an integrated circuit. In some embodiments, all of the components of the system 100 may be implemented utilizing an electronic circuit fabricated on a single substrate, such as a mixed signal chip that includes one or more digital signal processors (DSPs) and an analog neuromorphic circuit. The values of the mapping weight matrix W may be fixed in the neural network, such as by being stored in read-only memory of the integrated circuit or physically implemented in spike generating circuit of the integrated circuit (e.g., if a spike generating circuit is controlled based on a resistance value). Similarly, the values of the weights of the synaptic connections within the multi-layer recurrent neural network 150, such as connections 152R within the first excitatory neuron layer E1 152, the values of the weights of the connections 156R within the second excitatory neuron layer E2 156, the values of the weights of the connections between the first excitatory neuron layer E1 152 and the first inhibitory neuron layer 11 154, and the values of the weights of the connections between the second excitatory neuron layer E2 156 and the second inhibitory neuron layer I2 158, may also be fixed in the neural network.

Experimental Results

Figure 9A:
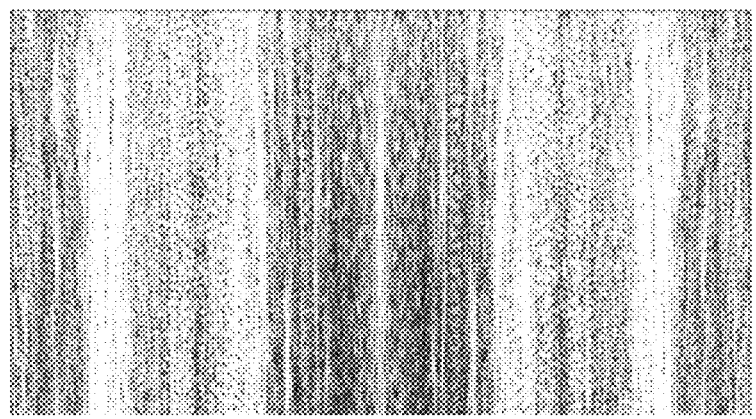
FIGS. 9A, 9B, and 9C show examples of amplitudes of raw SAR data of three civilian vehicles—a Toyota Camry, a Jeep, and a Toyota Tacoma, respectively.
Figure 9B:
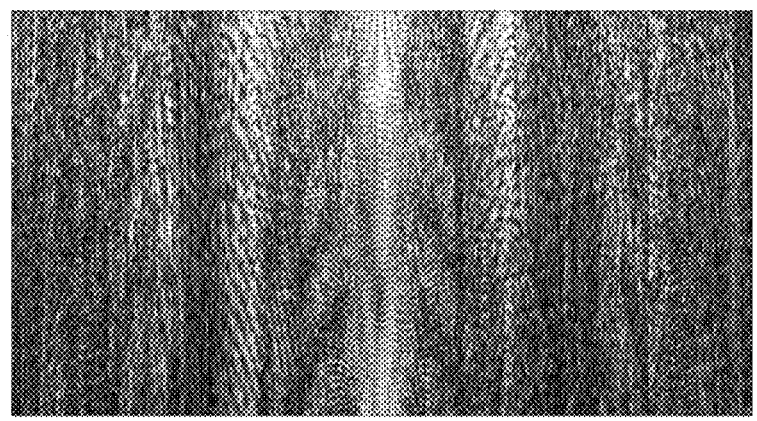
Figure 9C:
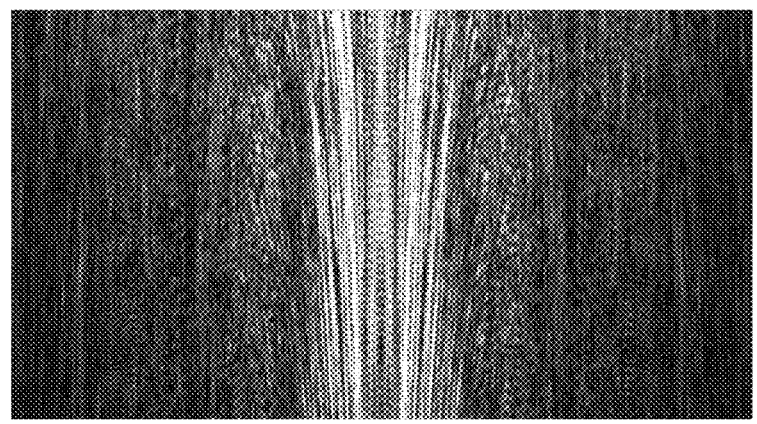

One embodiment of the present invention was implemented to test the performance of the system utilizing data captured from simulated SAR data. The testing data included simulated X-band SAR phase history of civilian vehicles. The data for each vehicle included three sets of raw SAR data collected from different elevation angles (e.g., from an aerial vehicle with a downward pointing SAR system) of 40 degree, 50 degree, and 60 degree. In this test, the raw SAR data of three vehicles—a Toyota Camry, a Jeep, and Toyota Tacoma—were used. FIGS. 9A, 9B, and 9C show examples of amplitudes of raw SAR data of the Toyota Camry, the Jeep, and the Toyota Tacoma respectively.

Figure 10A:
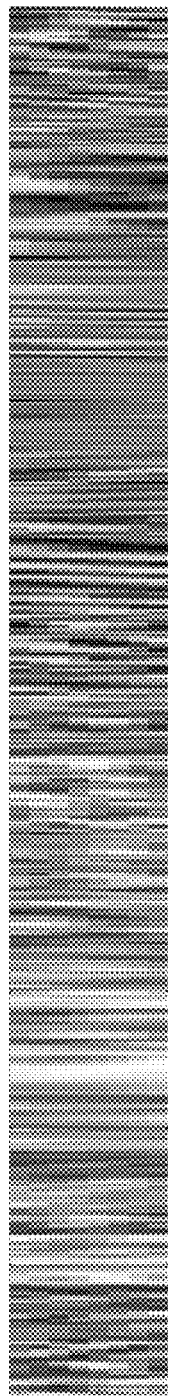
FIGS. 10A, 10B, and 10C, depict examples of SAR feature vectors at different elevations for the three types of vehicles computed in accordance with an embodiment of the present invention.
Figure 10B:
Figure 10C:

According to an experiment performed in accordance with one embodiment of the present invention, the original size of the testing data was 512 data points (frequency bins)×5600 data points (number of pulses). The number of pulses was down-sampled to 256 data points and the frequency bins was divided by 8 to form the 2D feature vectors. Accordingly, in the experiment, the 2D feature vectors had a size of 8×512 (8×256 for amplitude and 8×256 for phase). In our experiments, we used a sequence of sixty 2D feature vectors to represent a raw SAR data set; each feature sequence (data set) was presented to the network twenty times. In total, for each vehicle, one thousand two hundred 2D vectors were generated for training and testing. FIGS. 10A, 10B, and 10C, depict examples of SAR feature vectors at different elevations for the three types of vehicles computed in accordance with an embodiment of the present invention.

The neural network in accordance with one embodiment of the present invention, as used in the experiment, includes an input layer 130 having 8×512 neurons; a first excitatory neuron layer E1 152 having 16×1024 neurons; a second excitatory neuron layer E2 156 having 4×256 neurons; a first inhibitory neuron layer I1 154 having 4×128 neurons; a second inhibitory neuron layer I2 158 having 4×32 neurons; and a readout layer 170 having 5 neurons. A local neighborhood size of 5×5 neurons was used for the recurrent local connections 152R in the first excitatory neuron layer E1 152, and a local neighborhood size of 3×3 neurons was used for the recurrent local connections 156R in the second excitatory neuron layer E2 156. According to one aspect of embodiments of the present invention, the size of the local neighborhood connections is determined by the range of spatial-temporal correlations in the data. Because the E2 Layer is an abstraction or summary of the E1 Layer, the size of local neighborhood in the E2 Layer is generally smaller than the local neighborhood for the E1 Layer. In one embodiment, the synaptic weights from the input layer 130 to the first excitatory neuron layer E1 152 and from the first excitatory neuron layer E1 152 to the second excitatory neuron layer E2 156 are fixed (e.g., with a value of 32). The random connections between the first excitatory neuron layer E1 152 and the first inhibitory neuron layer I1 154 and between the second excitatory neuron layer E2 156 and the second inhibitory neuron layer I2 158 were set to 0.005 (0.5%). The system parameters for STDP leaning are summarized in Table 1.

TABLE 1

| Parameter | Value |
| --- | --- |
| $A_+$ | 10.0 |
| $A_-$ | 10.0 |
| $\tau_+$ | 194.0 |
| $\tau_-$ | 227.0 |
| KDECAY | 204.0 |
| E to I connection ratio | 0.005 |
| E $V_{th}$ | 279.0 |
| I $V_{th}$ | 376.0 |
| I to E connection ratio | 0.005 |

The parameters $A_+$, $A_-$, $\tau_+$, and $\tau_-$ are used in Equation 12, above. The parameter E $V_{th}$ is the neural firing threshold for excitatory neurons (neurons in excitatory layers 152 and 156) and I Vth is the neural firing threshold for inhibitory neurons (neurons in inhibitory layers 154 and 158). The E to I connection ratio and the I to E connection ratio are the random connection rates between for the connections 153 between the first excitatory neuron layer E1 152 and the first inhibitory neuron layer I1 154 and for the connections 157 between the second excitatory neuron layer E2 154 and the second inhibitory neuron layer I2 158.

In the experiment, the raw SAR data representing elevation angles of 40 degree and 60 degree were used to train the network (both in the unsupervised training of the multi-layer recurrent neural network 150 and supervised training of the readout layer 170). The raw SAR data of elevation angle 50 degrees was used for testing. Each data set was represented by a sequence of sixty 2D feature vectors (examples of these feature vectors are shown in FIGS. 9A, 9B, and 9C), where each 2D feature vector was presented to the network for 100 milliseconds. The time period of synaptic weight normalization was set to 50 milliseconds. The input neural firing range was set to a range of 5.0 Hz to 100.0 Hz. In various embodiments of the present invention, the connection ratio between excitatory neurons and inhibitory neurons (between E1 and I1; between E2 and I2) can be adjusted to control neural firing rates of the network. In experiments, the network had average firing rates of 8.9 Hz for excitatory neurons and 22.7 Hz for inhibitory neurons, which are in a reasonable range because the spiking firing rates for human brain are generally below 20 Hz. The classification results of the experiment are summarized in Table 2. The trained system produced an average classification rate of 92.13%.

TABLE 2

| | Computed ID | | |
| --- | --- | --- | --- |
| True ID | Camry | Jeep | Tacoma |
| Camry | 0.9892 | 0.0083 | 0.0025 |
| Jeep | 0.0508 | 0.9417 | 0.0075 |
| Tacoma | 0.0400 | 0.1217 | 0.8383 |
| Average Classification Rate | | | 92.31% |

As seen in Table 2, the system correctly classified the Camry data as a Camry 98.92% of the time (incorrectly classifying the Camry as Jeep 0.83% of the time and incorrectly classifying the Camry as Tacoma 0.25% of the time), correctly classified the Jeep as a Jeep 94.17% of the time (incorrectly classifying the Jeep as a Camry 5.08% of the time and incorrectly classifying the Jeep as a Tacoma 0.75% of the time, and correctly classifying the Tacoma data as a Tacoma 83.83% of the time (incorrectly classifying the Tacoma as a Camry 4.00% of the time and incorrectly classifying the Tacoma as a Jeep 12.17% of the time).

As such, the experimental test produced an accuracy of about 92.31% in average classification rate, even without forming SAR images, and through the use of a multi-layer recurrent spiking neural network, both characteristics of which result in less energy consumption than comparative neural networks that process SAR images, due in part to the reduced computational requirements for SAR data based target recognition. Generally, some embodiments of the present invention compute a set of SAR features from raw SAR data, and encode the SAR features into spiking sequences utilizing a spiking, multi-layer recurrent neural network. The neural network converts spatial information of the SAR data into temporal sequences and enables processing SAR data in the spiking domain, which is an energy efficient technique for data processing. The recurrent characteristic of the neural network further allows correlation of features over time. Averaged spiking rates of SAR data are used for target recognition by a readout neural layer trained through a supervised learning process. Simulated SAR data of civilian vehicles was used to evaluate the system, and experimental tests show that the proposed system is effective to recognize different SAR targets without forming SAR images. Some embodiments of the present invention can be implemented by a neuromorphic chip, thereby producing a SAR target recognition system with real-time computing capabilities and very low-power consumption.

Various portions of the target classification system that refer to the use of a "processor" may be implemented with logic gates, or with any other embodiment of a processing unit or processor. The term "processing unit" or "processor" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). While, in some embodiments, the input spiking network 130, the multi-layer recurrent neural network 150, and the readout neural layer 170 of the target classification system are implemented utilizing neuromorphic hardware, in some embodiments of the present invention, including some embodiments during a training process in which the parameters of the spiking input neural network 130 and the multi-layer recurrent neural network 150 are computed and the classifier weights of the readout neural layer 170 are computed, the spiking input neural network 130, the multi-layer recurrent neural network 150, and the readout neural layer 170 may be simulated by a processor.

Figure 11:
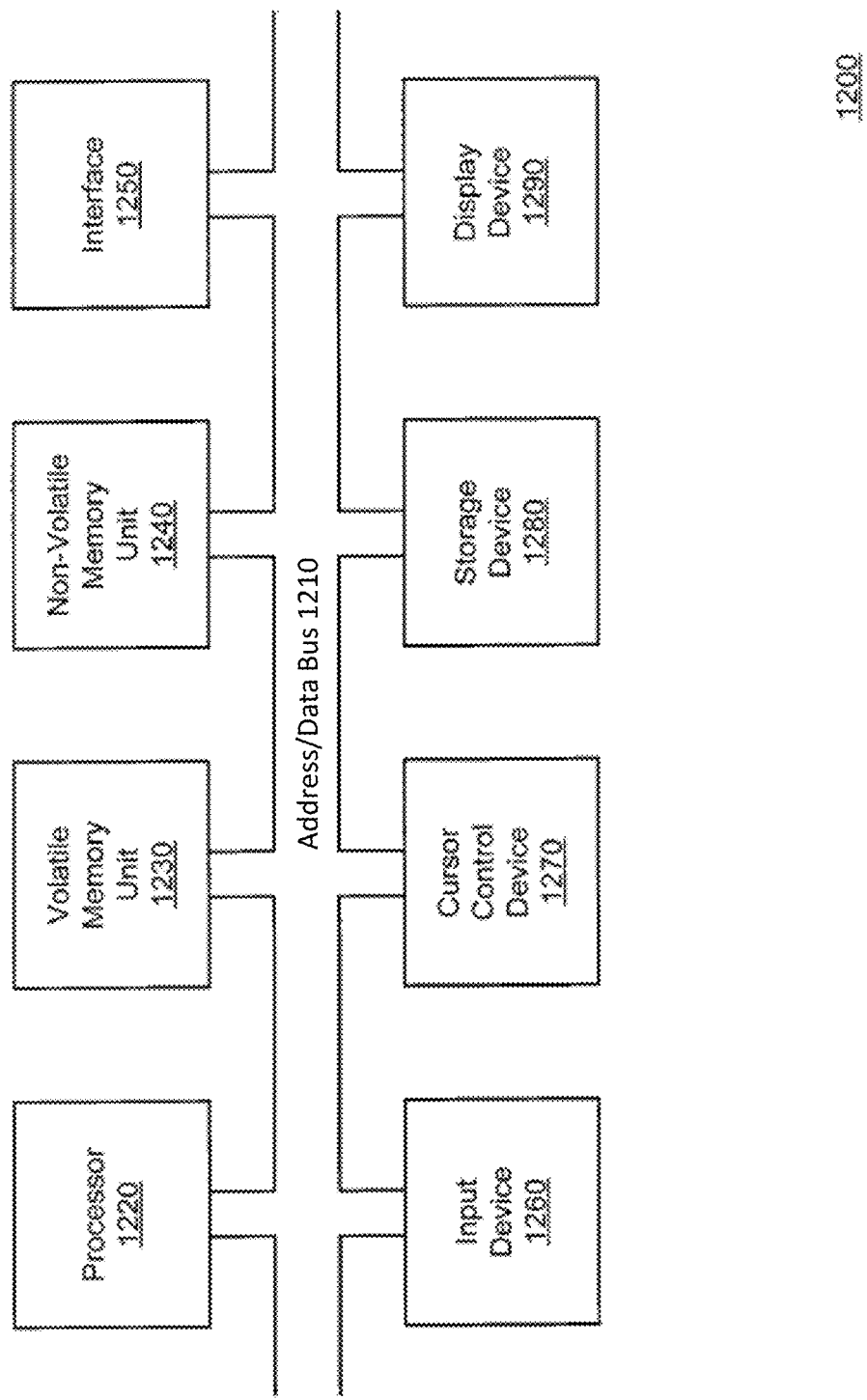
FIG. 11 is a block diagram of a computer system that may be used in conjunction with embodiments of the present invention.

An exemplary computer system 1200 in accordance with an embodiment is shown in FIG. 11. Exemplary computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of exemplary computer system 1200. When executed, the instructions cause exemplary computer system 1200 to perform specific actions and exhibit specific behavior, such as described herein.

Exemplary computer system 1200 may include an address/data bus 1210 that is configured to communicate information. Additionally, one or more data processing unit, such as processor 1220, are coupled with address/data bus 1210. Processor 1220 is configured to process information and instructions. In an embodiment, processor 1220 is a microprocessor. Alternatively, processor 1220 may be a different type of processor such as a parallel processor, or a field programmable gate array.

Exemplary computer system 1200 is configured to utilize one or more data storage units. Exemplary computer system 1200 may include a volatile memory unit 1230 (e.g., random access memory ("RAM"), static RAM, dynamic RAM, etc.) coupled with address/data bus 1210, wherein volatile memory unit 1230 is configured to store information and instructions for processor 1220. Exemplary computer system 1200 further may include a non-volatile memory unit 1240 (e.g., read-only memory ("ROM"), programmable ROM ("PROM"), erasable programmable ROM ("EPROM"), electrically erasable programmable ROM "EEPROM"), flash memory, etc.) coupled with address/data bus 1210, wherein non-volatile memory unit 1240 is configured to store static information and instructions for processor 1220. Alternatively exemplary computer system 1200 may execute instructions retrieved from an online data storage unit such as in "Cloud" computing. In an embodiment, exemplary computer system 1200 also may include one or more interfaces, such as interface 1250, coupled with address/data bus 1210. The one or more interfaces are configured to enable exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, exemplar computer system 1200 may include an input device 1260 coupled with address/data bus 1210, wherein input device 1260 is configured to communicate information and command selections to processor 1220. In accordance with one embodiment, input device 1260 is an alphanumeric input device, such as a keyboard, that may include alphanumeric and/or function keys. Alternatively, input device 1260 may be an input device other than an alphanumeric input device. In an embodiment, exemplar computer system 1200 may include a cursor control device 1270 coupled with address/data bus 1210, wherein cursor control device 1270 is configured to communicate user input information and/or command selections to processor 1220. In an embodiment, cursor control device 1270 is implemented utilizing a device such as a mouse, a track-ball, a track-pad, an optical tracking device, or a touch screen. The foregoing notwithstanding, in an embodiment, cursor control device 1270 is directed and/or activated via input from input device 1260, such as in response to the use of special keys and key sequence commands associated with input device 1260. In an alternative embodiment, cursor control device 1270 is configured to be directed or guided by voice commands.

In an embodiment, exemplary computer system 1200 further may include one or more optional computer usable data storage devices, such as storage device 1280, coupled with address/data bus 1210. Storage device 1280 is configured to store information and/or computer executable instructions. In one embodiment, storage device 1280 is a storage device such as a magnetic or optical disk drive (e.g., hard disk drive ("HDD"), floppy diskette, compact disk read only memory ("CD-ROM"), digital versatile disk ("DVD")). Pursuant to one embodiment, a display device 1290 is coupled with address/data bus 1210, wherein display device 1290 is configured to display video and/or graphics. In an embodiment, display device 1290 may include a cathode ray tube ("CRT"), liquid crystal display ("LCD"), field emission display ("FED"), plasma display or any other display device suitable for displaying video and/or graphic images and alphanumeric characters recognizable to a user.

Exemplary computer system 1200 is presented herein as an exemplary computing environment in accordance with an embodiment. However, exemplary computer system 1200 is not strictly limited to being a computer system. For example, an embodiment provides that exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented utilizing computer-executable instructions, such as program modules, being executed by a computer. In one exemplary implementation, such program modules include routines, programs, objects, components and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for identifying a target in a synthetic aperture radar signal, the method comprising:
    extracting, by a feature extractor, a plurality of features directly from phase history data of the synthetic aperture radar signal;
    encoding, by an input spiking neural network, the features as a first plurality of spiking signals;
    supplying the spiking signals to a multi-layer recurrent neural network to compute a second plurality of spiking signals;
    computing, by a readout neural layer, a signal identifier based on the second plurality of spiking signals; and
    outputting the signal identifier from the readout neural layer, the signal identifier identifying the target.

2. The method of claim 1, wherein the plurality of features comprise an amplitude of the synthetic aperture radar signal.

3. The method of claim 1, wherein the plurality of features comprise a phase of the synthetic aperture radar signal.

4. The method of claim 1, wherein the readout neural layer comprises a linear classifier.

5. The method of claim 1, wherein the input spiking neural network, the multi-layer recurrent neural network, and the readout neural layer are implemented by a neuromorphic chip.

6. The method of claim 1, further comprising computing average spiking rates from the second plurality of spiking signals,
    wherein the signal identifier is computed based on the average spiking rates.

7. The method of claim 1, wherein the multi-layer recurrent neural network comprises:
    a first excitatory neuron layer configured to receive the first plurality of spiking signals from the input spiking neural network;
    a first inhibitory neuron layer;
    a second excitatory neuron layer; and
    a second inhibitory neuron layer connected to the second excitatory neuron layer,
    the first excitatory neuron layer being configured to supply spiking signals to:
        the first excitatory neuron layer;
        the first inhibitory neuron layer; and
        the second excitatory neuron layer,
    the first inhibitory neuron layer being configured to supply spiking signals to the first excitatory neuron layer,
    the second excitatory neuron layer being configured to supply spiking signals to:
        the second excitatory neuron layer;
        the second inhibitory neuron layer; and
        the readout neural layer, and
    the second inhibitory neuron layer being configured to supply spiking signals to the second excitatory neuron layer.

8. The method of claim 7, wherein the input spiking neural network comprises a plurality of input neurons arranged in a grid,
    wherein the first excitatory neuron layer comprises a plurality of first excitatory neurons arranged in a grid, the plurality of first excitatory neurons comprising a plurality of critical neurons uniformly distributed in the grid, and
    wherein the plurality of input neurons are connected to the critical neurons to maintain spatial relationships between the input neurons in corresponding ones of the critical neurons.

9. The method of claim 7, wherein the first excitatory neuron layer comprises a plurality of excitatory neurons arranged in a grid, and
    wherein a neuron of the first excitatory neuron layer is configured to supply spiking signals to neurons in a local neighborhood of the grid around the neuron.

10. The method of claim 7, wherein the first excitatory neuron layer comprises a plurality of first excitatory neurons arranged in a grid,
    wherein the second excitatory neuron layer comprises a plurality of second excitatory neurons arranged in a grid, and
    wherein the plurality of first excitatory neurons are connected to the second excitatory neurons to maintain spatial relationships between the first excitatory neurons in corresponding ones of the second excitatory neurons.

11. A system configured to identify a target in a synthetic aperture radar signal, the system comprising:
    a feature extractor configured to extract a plurality of features directly from phase history data of the synthetic aperture radar signal;
    an input spiking neural network configured to encode the features as a first plurality of spiking signals;
    a multi-layer recurrent neural network configured to compute a second plurality of spiking signals based on the first plurality of spiking signals;
    a readout neural layer configured to compute a signal identifier based on the second plurality of spiking signals; and
    an output configured to output the signal identifier, the signal identifier identifying the target.

12. The system of claim 11, wherein the plurality of features comprise an amplitude of the synthetic aperture radar signal.

13. The system of claim 11, wherein the plurality of features comprise a phase of the synthetic aperture radar signal.

14. The system of claim 11, wherein the readout neural layer comprises a linear classifier.

15. The system of claim 11, wherein the input spiking neural network, the multi-layer recurrent neural network, and the readout neural layer are implemented by a neuromorphic chip.

16. The system of claim 11, wherein the readout neural layer is configured to compute average spiking rates from the second plurality of spiking signals,
    wherein the signal identifier is computed based on the average spiking rates.

17. The system of claim 11, wherein the multi-layer recurrent neural network comprises:
    a first excitatory neuron layer configured to receive the first plurality of spiking signals from the input spiking neural network;
    a first inhibitory neuron layer;
    a second excitatory neuron layer; and
    a second inhibitory neuron layer connected to the second excitatory neuron layer,
    the first excitatory neuron layer being configured to supply spiking signals to:
        the first excitatory neuron layer;
        the first inhibitory neuron layer; and
        the second excitatory neuron layer,
    the first inhibitory neuron layer being configured to supply spiking signals to the first excitatory neuron layer,
    the second excitatory neuron layer being configured to supply spiking signals to:

the second excitatory neuron layer;

the second inhibitory neuron layer; and the readout neural layer, and the second inhibitory neuron layer being configured to supply spiking signals to the second excitatory neuron layer.

18. The system of claim 17, wherein the input spiking neural network comprises a plurality of input neurons arranged in a grid, wherein the first excitatory neuron layer comprises a plurality of first excitatory neurons arranged in a grid, the plurality of first excitatory neurons comprising a plurality of critical neurons uniformly distributed in the grid, and wherein the plurality of input neurons are connected to the critical neurons to maintain spatial relationships between the input neurons in corresponding ones of the critical neurons.

19. The system of claim 17, wherein the first excitatory neuron layer comprises a plurality of excitatory neurons arranged in a grid, and wherein a neuron of the first excitatory neuron layer is configured to supply spiking signals to neurons in a local neighborhood of the grid around the neuron.

20. The system of claim 17, wherein the first excitatory neuron layer comprises a plurality of first excitatory neurons arranged in a grid, wherein the second excitatory neuron layer comprises a plurality of second excitatory neurons arranged in a grid, and wherein the plurality of first excitatory neurons are connected to the second excitatory neurons to maintain the spatial relationships between the first excitatory neurons in corresponding ones of the second excitatory neurons.

21. A system for identifying a target in a synthetic aperture radar signal, the system comprising:

means for extracting a plurality of features directly from phase history data of the synthetic aperture radar signal;

means for encoding the features as a first plurality of spiking signals;

means for supplying the spiking signals to a multi-layer recurrent neural network to compute a second plurality of spiking signals;

means for computing a signal identifier based on the second plurality of spiking signals; and means for outputting the signal identifier from the means for computing the signal identifier, the signal identifier identifying the target.

* * * * *